United States Patent [19]

Teyssier et al.

[11] 4,299,809

[45] Nov. 10, 1981

[54] PROCESS FOR THE MANUFACTURE OF CALCIUM CHLORIDE

[75] Inventors: Gerard Teyssier, Aramon; Marcel Lepant, Paris, both of France

[73] Assignee: I.S.O., Aramon, France

[21] Appl. No.: 111,788

[22] Filed: Jan. 14, 1980

[30] Foreign Application Priority Data

Jan. 12, 1979 [FR] France ................ 79 01299

[51] Int. Cl.³ .................. C01F 11/24; C01B 31/20
[52] U.S. Cl. ................... 423/497; 423/438; 422/242
[58] Field of Search .................. 423/438, 497

[56] References Cited

U.S. PATENT DOCUMENTS 3,810,970 5/1974 McCormick ............ 423/497
4,100,254 7/1978 Grohman ............... 423/497

FOREIGN PATENT DOCUMENTS 28087 1/1884 Fed. Rep. of Germany .
1426207 11/1964 France .
1513749 2/1967 France .
136896 12/1919 United Kingdom ......... 423/497
143844 2/1969 United Kingdom ......... 423/438

Primary Examiner—Brian E. Hearn
Attorney, Agent, or Firm—Sandler & Greenblum

[57] ABSTRACT

A process for the production of calcium chloride by the reaction of hydrochloric acid with calcium carbonate in the upper sealed portion of a reactor bordered on one side by a filtration sieve. The process comprises reacting the hydrochloric acid with the calcium carbonate to form carbon dioxide and calcium chloride solution, and pressuring the solution of calcium chloride by means of the carbon dioxide across the sieve and towards an outlet of the reactor.

4 Claims, 1 Drawing Figure

PROCESS FOR THE MANUFACTURE OF CALCIUM CHLORIDE

BACKGROUND OF THE INVENTION

1. Field of the Invention

The present invention relates to a process for the manufacture of calcium chloride. More particularly, it relates to a process and apparatus allowing for the production, continuously, of a solution of calcium chloride obtained by action of hydrochloric acid on calcium carbonate.

2. Description of Prior Art

It is known that this reaction may be caused by the discontinuous neutralization, in a reservoir, of an aqueous hydrochloric acid solution with the assistance of mechanical agitation. These methods and the apparatus for carrying them out, have, however, the following disadvantages:

long reaction time: the speed of attack being limited by the considerable volume of foam created by the carbon dioxide;

necessity of providing a recovery system of hydrochloric acid droplets entrained towards the atmosphere by the flow of carbon dioxide;

necessity of employing mechanical means for agitating the reaction site and for transporting the suspension across the filtration bed adapted to purify it of grains of excess calcium carbonate.

SUMMARY OF THE INVENTION

One aim of the process and apparatus according to the present invention is to overcome the disadvantages of methods and apparatus presently utilized for the production of calcium chloride. An object of the invention resides in the development of a process adapted to be put into operation by means of a simple and strong apparatus whose operation or regulation requires no utilization of electrical or mechanical energy. Another objective sought by the object of the invention is the production of calcium chloride by a process and apparatus causing no atmospheric or effluent polution. Another object of the process and of the apparatus claimed is to allow for a simple recovery of carbon dioxide resulting from the reaction.

The process according to the invention is remarkable in that the reaction between the hydrochloric acid and the calcium carbonate is carried out in the upper portion of the reactor closed in a sealed fashion and defined by a filtration sieve, in a fashion such that the pressure of the carbon dioxide caused by the reaction serves as a vehicle for assuring the propulsion of the solution of calcium chloride obtained across the sieve towards the outlet of the reactor.

The installation according to the invention comprises a reactor whose upper portion is adapted for the introduction of calcium carbonate and hydrochloric acid and comprises an outlet orifice for the evacuation of the solution of calcium chloride obtained; This system is remarkable in the upper portion of the reactor is defined by a filtration sieve and enclosed in a sealed fashion, in a fashion so as to form a reaction chamber whose base is constituted by this sieve; the outlet orifice being positioned beneath the said sieve.

BRIEF DESCRIPTION OF THE DRAWING

These aims and characteristics, and others as well, will be highlighted from the description which follows and from the annexed drawing whose single FIGURE is a vertical cross-section of schematic character, of the apparatus according to the invention.

DESCRIPTION OF PREFERRED EMBODIMENTS

Figure 1:
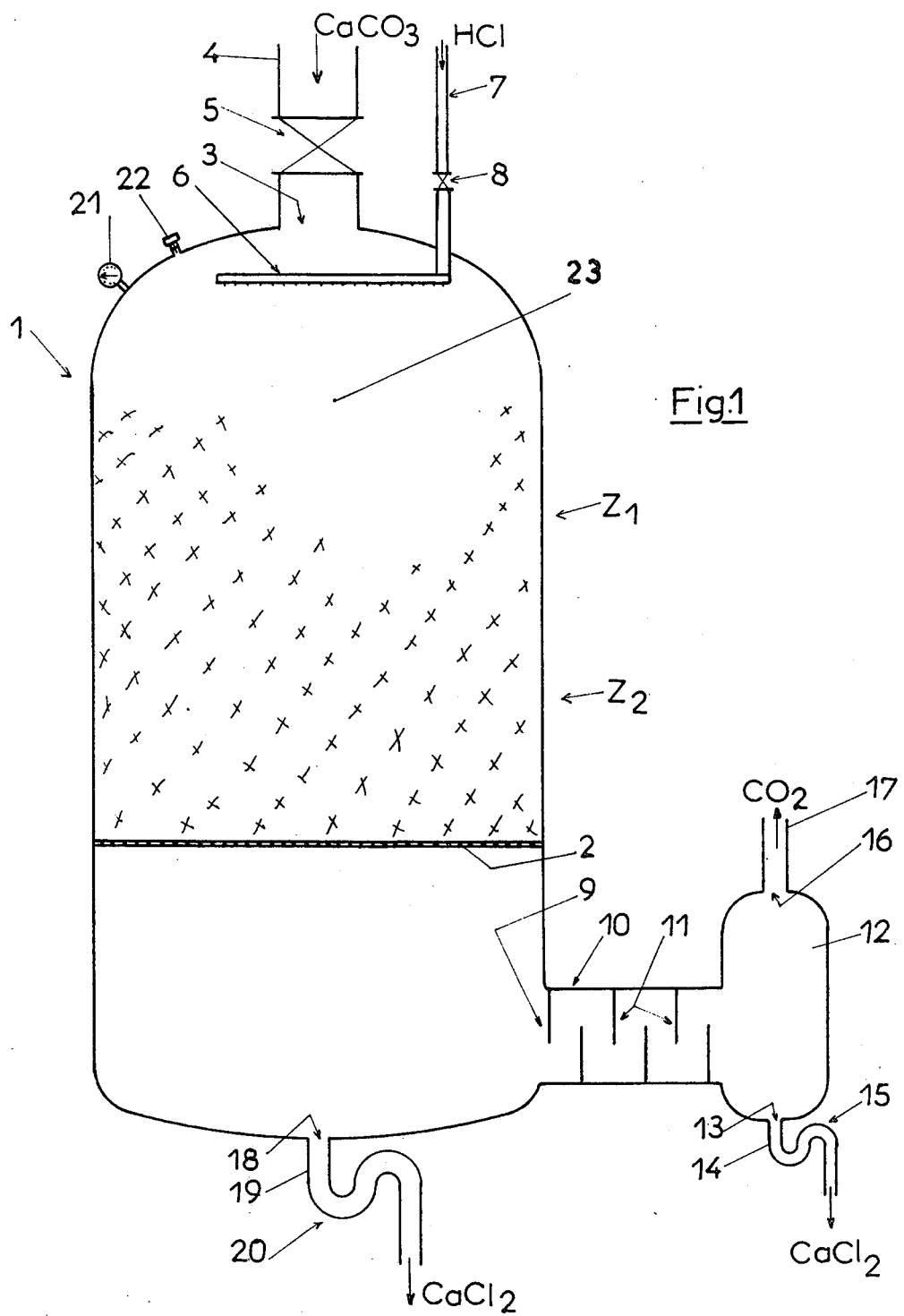

The installation comprises a reactor constituted by a closed reservoir 1, of generally cylindrical shape, for example formed out of any appropriate metal and protected, interiorly, by an acid resistant coating known in itself. The dimensions of this reactor vary as a function of the necessities, the said reactor being able to advantageously have a height double its diameter and to be constructed to resist interior pressures of 3-5 bars. It is equipped, interiorly, with a filtration sieve 2 adapted to retain the charge of calcium carbonate while permitting the passage of the solution brought about by the reaction. At its top, the reactor comprises a large opening 3 communicating with a vertical feed conduit 4 connected to the base of a charging funnel (not shown) adapted to contain calcium carbonate and positioned above the reactor. A valve 5, for example installed on the conduit 4, allows for the alternate opening and shutting of the seal of the feed orifice 3 during the operation of the apparatus.

Means for watering or spraying, for example constituted by a watering array 6 made of resistant material, are installed, interiorly, at the upper portion of the reactor. These watering means are connected to a hydrochloric acid reservoir (not shown) by means of an appropriate piping 7 equipped with a valve 8. This acid reservoir is positioned above the level at which are installed the watering or spraying means, in a fashion such that the solution of hydrochloric acid can flow by gravity to the watering or spraying means.

The filtration sieve 2 bordered by the upper portion of the reactor closed in a sealed fashion when the valves 5 and 8 are in closed position, in a fashion so as to constitute a reaction chamber 23 whose face is constituted by the said sieve. At its lower portion, the reactor comprises at least one outlet orifice positioned beneath the sieve 2 and communicating with a separator. In an advantageous fashion, an outlet orifice 9 of large diameter is provided at the base of the reactor, in the lateral wall of this latter. This orifice communicates with a collector 10 of identical diameter, provided with interior baffles 11 and communicating with a separator 12, the said baffles serving to brake the arrival of the solution of calcium chloride and of carbon dioxide in the said separator. This separator comprises:

at its base, an outlet orifice 13 communicating with a collector conduit 14 provided with siphon 15 and feeding into the upper portion of a storage container (not shown) or other recovery receiver of the calcium chloride;

at its upper portion, an outlet orifice 16 communicating with the conduit 17 which can advantageously be connected to a reservoir or other recovery installations (not shown). The bottom of the reactor is provided with an emptying orifice 18 communicating with a collector conduit 19 provided with a siphon 20 and ending likewise at the upper portion of the calcium chloride recovery container. A monometer 21 and valve 22 installed at the upper portion of the reactor, allow, respectively, for the control of the pressure and the for the assurance of the safety of the installation.

The process of the invention carried out by means of the apparatus previously described will now be explained:

The opening of the valve 5 allows for the introduction, by gravity, in the upper portion or reactor chamber 23 of the reactor of the calcium carbonate ($CaCO_3$), which is, for example, ground into particles of 0.1–30 mm, preferably into particles of 5–10mm. This charge can have a volume of 1–25 m3.

After introduction of the desired volume of calcium carbonate, the valve 5 is closed, while the valve 8 is opened allowing for the watering or the spraying, by gravity, of the aqueous hydrochloric acid solution (HCl) onto the charge of calcium carbonate.

The reaction occurs in a relatively short time and the solution of calcium chloride produced is propelled, in the direction of the outlet orifice 13 from the upper reaction zone Z1, across the subjacent zone Z2 under the pressure of the carbon dioxide brought about by the said reaction, while thus assuring the complete neutralization and clarification of the said solution of calcium chloride.

When the upper level of the calcium carbonate charge reaches the neutralization zone Z2, the valve 8 closes, while the valve 5 opens again to allow the introduction of the necessary quantity of calcium carbonate to fill the volume of the reaction zone Z1.

The valve 5 is thus closed, while the valve 8 is opened, and as a result, the installation apparatus operates in a continuous fashion by the repetition of the above cycle.

The automatic operation of this installation is assured by any appropriate automation device, known in itself.

The salt solution propelled by the carbon dioxide is brought, across the collector 10, to the separator 12 from where the solution of calcium chloride ($CaCl_2$) descends by gravity, in the storage container, while the carbon dioxide ($CO_2$) free of hydrochloric acid leaves via orifice 16 and is brought towards a recovery apparatus.

The value of the process and the apparatus according to the invention, is very clear from the preceeding description and the annexed drawing.

However, the following advantages should be noted:

Possibility for utilizing inexpensive raw materials, i.e.: hydrochloric acid solutions of various concentrations coming from other industrial processes, and crushed raw calcium carbonate extracted from a quarry;

Production, when using concentrated acid, of a heat of reaction sufficient to bring the exiting solution to a temperature included between 30 and 50 degrees Centigrate, thus avoiding the premature crystallization of the hexahydrate in the installation;

Capacity of considerable production for an installation of reduced dimensions, whose median size allows for a production of concentrated calcium chloride solution ranging from 2–10 tons/hour;

Simple and strong construction of high reliability comprising no mechanical or electrical components, sources of breakdowns;

No necessity of mechanical energy for the operation or the regulation;

Total absence of atmospheric pollution, by virtue of quantitative yield of the reaction with respect to the hydrochloric acid and;

Simple recovery of the carbon dioxide adapted to be utilized directly in a compression apparatus after a simple drying.

What is claimed is:

1. A process for the production of calcium chloride by the reaction of hydrochloric acid with calcium carbonate in the upper sealed portion of a reactor bordered on one side by a filtration sieve, a charge of said calcium carbonate resting on said sieve, said process comprising reacting said hydrochloric acid with said calcium carbonate by introducing said calcium carbonate and said hydrochloric acid on the same side of said filtration sieve to form carbon dioxide and calcium chloride solution, and pressuring said solution of calcium chloride downwardly by means of said carbon dioxide across said sieve and towards an outlet of said reactor.

2. The process as defined by claim 1 comprising providing a neutralization zone in said upper sealed portion of said reactor, said neutralization zone comprising a layer of calcium carbonate, and further providing a reaction zone, said reaction zone being positioned above said neutralization zone and whereby said process comprises propelling said calcium chloride solution produced in said reaction zone towards the outlet of said reactor across said neutralization zone.

3. The process as defined by either of claims 1 or 2 further comprising pressuring said calcium chloride solution by means of said carbon dioxide into a separator and separating said solution and carbon dioxide gas from one another in said separator, whereby said solution descends by gravity within said separator to a storage tank and said process further comprises removing said separated carbon dioxide gas to a recovery apparatus.

4. The process as defined by claim 3 comprising providing a collector comprising interior baffles between said outlet of said reactor and the inlet of said separator and said process comprises pressuring said carbon dioxide gas and said calcium chloride solution through said collector.

* * * * *

UNITED STATES PATENT AND TRADEMARK OFFICE
CERTIFICATE OF CORRECTION

PATENT NO. : 4,299,809

DATED : November 10, 1981

INVENTOR(S) : Gerard TEYSSIER et al.

It is certified that error appears in the above—identified patent and that said Letters Patent is hereby corrected as shown below:

Column 2, line 8, "reservoir" should be --container--;
At Column 2, line 13, "said" should be deleted.

Signed and Sealed this

Ninth Day of February 1982

[SEAL]

Attest:

GERALD J. MOSSINGHOFF

*Attesting Officer*     *Commissioner of Patents and Trademarks*